United States Patent [19]

Innis, Jr. et al.

[11] 4,389,053
[45] Jun. 21, 1983

[54] WATER GUARD FOR ROLLING MILL OIL FILM BEARING

[75] Inventors: Charles L. Innis, Jr., Paxton; Lowell S. Salter, Jr., Shrewsbury; Harry Boghosian, Worcester, all of Mass.; Donald H. Wilkinson, Palmyra, N.Y.

[73] Assignee: Morgan Construction Company, Worcester, Mass.

[21] Appl. No.: 362,109

[22] Filed: Mar. 26, 1982

[51] Int. Cl.³ .................. F16J 15/32; F16J 15/34
[52] U.S. Cl. ............................... 277/95; 277/12; 277/84; 277/152
[58] Field of Search ............... 277/12, 32, 84, 138, 277/152, 153, 205, 92, 95

[56] References Cited

U.S. PATENT DOCUMENTS

| | | | |
|---|---|---|---|
| 2,364,383 | 12/1944 | Neesen | 288/5 |
| 2,370,913 | 3/1945 | Procter | 277/153 X |
| 2,372,095 | 3/1945 | Leistensnider et al. | 288/5 |
| 2,538,198 | 1/1951 | Hosford | 288/2 |
| 2,736,586 | 2/1956 | Riesing | 288/11 |
| 2,930,643 | 3/1960 | Mastrobattista et al. | 277/153 |
| 3,837,660 | 9/1974 | Poggio | 277/153 X |
| 4,022,480 | 5/1977 | Salter | 277/95 |
| 4,071,255 | 1/1978 | Salter | 277/95 X |
| 4,165,881 | 8/1979 | Salter | 277/95 X |
| 4,234,196 | 11/1980 | Iida | 277/12 |

FOREIGN PATENT DOCUMENTS

| | | | |
|---|---|---|---|
| 2709000 | 9/1978 | Fed. Rep. of Germany | 277/152 |
| 556596 | 10/1943 | United Kingdom | 277/152 |
| 2076481A | 12/1981 | United Kingdom | 277/152 |

Primary Examiner—Robert S. Ward, Jr.
Attorney, Agent, or Firm—Thompson, Birch, Gauthier & Samuels

[57] ABSTRACT

A water guard for use in a rolling mill wherein the neck of a roll is rotatably supported in an oil film bearing contained in a bearing chock, with a seal assembly located between the roll end face and the bearing chock to retain oil in the bearing and to exclude contaminants such as cooling water, mill scale, etc. from the bearing. The seal assembly includes a circular seal end plate fixed relative to the bearing chock at a location surrounding a flexible seal mounted on the roll neck for rotation therewith. The water guard is circular and it has a radially extending mounting flange integrally joined at its inner edge to an angularly outwardly extending sealing flange. The mounting flange is adapted to be surrounded by and to be secured to the seal end plate, and to provide the sole means for supporting and maintaining the sealing flange in frictional contact with the roll end face. Both the water guard flanges are elastically flexible with the mounting flange having a rigidity which is greater than that of the sealing flange.

8 Claims, 8 Drawing Figures

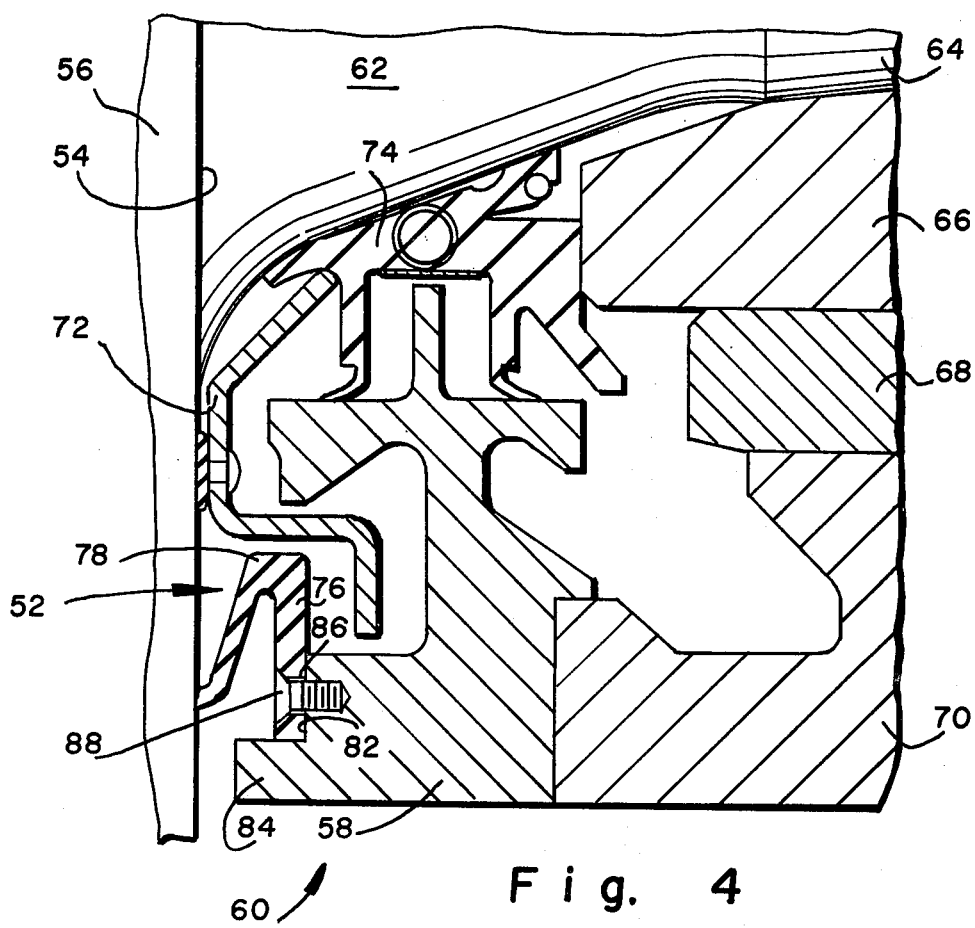
Fig. 4
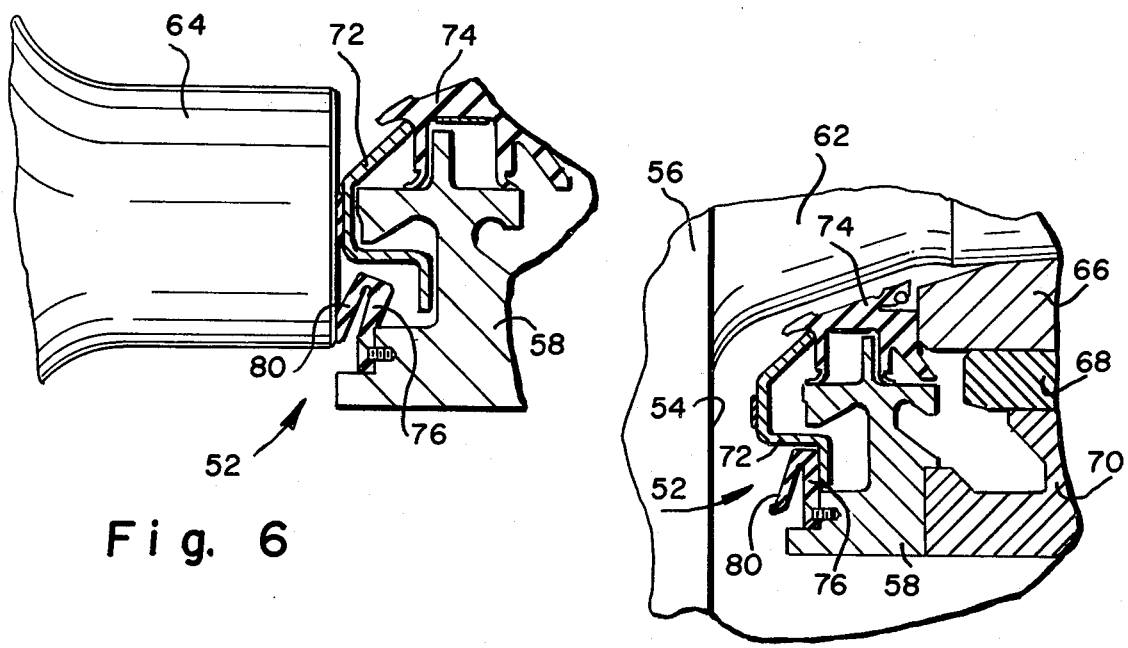
Fig. 6
Fig. 7

WATER GUARD FOR ROLLING MILL OIL FILM BEARING

BACKGROUND OF THE INVENTION

1. Field of the Invention

This invention relates to an improved water guard for use in oil film bearings of the type employed in rolling mills.

2. Description of the Prior Art

As shown for example in U.S. Pat. No. 4,071,255, water guards have conventionally comprised circular elastomeric elements applied externally to the outer seal rings of oil film bearings. One such arrangement is illustrated in FIG. 1 where the roll 10 has an end face 12 joined by an intermediate tapered section 14 to a reduced diameter section 16 surrounded by a sleeve 18. The sleeve is keyed or otherwise secured to the roll neck, and is journalled in a bushing 20 fixed within a chock 22. Oil is supplied continuously between the sleeve and bushing, and a seal assembly generally indicated at 24 surrounds the intermediate tapered section 14 to prevent oil from escaping from the bearing and also to prevent externally applied cooling water and entrained contaminants such as dirt, mill scale, etc. from penetrating into the bearing.

The seal assembly 24 includes a flexible flanged neck seal 26 and an inner sealing ring 28, both of which are carried on the roll for rotation therewith, and a seal end plate 30, outer seal ring 32 and water guard 34 all of which are fixed in relation to the chock 22. This sealing arrangement is well known to those skilled in the art, and thus little if any further explanation is required, except perhaps with regard to the water guard 34 and the outer seal ring 32.

The primary role of the water guard is to provide the first line of defense against the unwanted and potentially damaging ingress of cooling water and entrained contaminants into the bearing. The role of the outer seal ring 32 is a bit more diverse. This component cooperates with the inner seal ring 28 to establish a sealing labyrinth leading to a drain opening 32a. The outer seal ring also serves as the support for the externally applied water guard 34. Additionally, however, when the bearing is being removed from the roll neck, the outer seal ring 32 contacts the inner seal ring 28 and exerts through it a force sufficient to pull both the inner seal ring and the neck seal 26 off of the roll neck. Also, it will be understood that during rolling, the roll neck on the non-thrust side of the roll will have a tendency to shift or "float" axially with regard to the chock 22 due to thermal expansion, mechanical tolerances, etc. If kept within acceptable limits, this axial floating does not damage the bearing. The importance of the outer seal ring 32 in this regard is that it serves as a stop against which the roll end face 12 can abut to limit axial floating and thereby safeguard internal bearing components from damage that might otherwise occur.

In order for the water guard 34 to provide an effective seal, its resilient lip 34a must be in continuous sealing contact with the roll end face 12. This, however, limits the extent to which the rolls can be reground to compensate for normal wear. For example, in the arrangement shown in FIG. 1, it is impossible to reduce the roll diameter to less than $D_1$ without destroying the sealing relationship between the water guard lip 34a and the roll end face 12. Were it not for this limitation, the roll could undergo further reductions in diameter to about $D_2$, thus considerably extending useful roll life.

In order to increase useful roll life, bearing designers have proposed an alternate water guard design of the type shown in FIG. 2. Essentially, this design eliminates the outer seal ring (32 in FIG. 1) in favor of a modified water guard generally indicated at 36 and consisting of an elastomeric member 38 bonded to and reinforced by a circular metal stamping 40. While this design does permit a beneficial further reduction of roll diameters to $D_2$, it suffers from other serious deficiencies. Of particular concern is the relative fragility of the circular metal stamping 40 as compared to the outer seal ring 32 of the FIG. 1 arrangement. Although the metal stamping 40 can exert the force required to pull the inner seal ring 28 and neck seal 26 off of the neck when the bearing is being removed, it is not sufficiently sturdy to act as a float limiting stop. Thus, when the roll has a tendency to float excessively, causing the roll end face to come up against the water guard 36, the metal stamping 40 undergoes deformation, and because the stamping is essentially non-resiliant, this deformation is permanent. This not only results in the water guard being irreparably damaged, but it also raises the possibility that other internal bearing components may become damaged as the roll floats beyond safe limits.

To avoid these problems, bearing designers have proposed a still further modification as shown in FIG. 3. Here, the water guard 42 again consists of an elastomeric member 44 bonded to and reinforced by a metal stamping 46. The stamping is mounted in a recess 48 in the seal end plate, and a protruding shoulder 50 on the seal end plate serves as a float limiting stop. The stamping 46 again has sufficient rigidity to exert the required pulling force on the inner seal ring and neck seal.

Although this third modification is an improvement over those shown in FIGS. 1 and 2, it too suffers from serious drawbacks. For example, the metal stamping 46 remains non-resilient, relatively fragile, and thus susceptible to permanent damage during mounting of the bearing on the roll neck. For example, if there should be a misalignment of the bearing and the roll neck during mounting, the roll end may come into contact with the water guard 42, causing the reinforcing metal stamping 46 to become permanently deformed. Should this occur, the effectiveness of the water guard will be adversely affected, necessitating its immediate replacement. An additional drawback with this design, as well as with the design shown in FIG. 2, is that it is extremely difficult to achieve a reliable bond between the elastomeric portion of the water guard and the metal reinforcing portion. Experience has demonstrated that coolant attack, coupled with the high torsional forces to which the water guard is subjected, often destroys this bond, causing the elastomeric portion to be stripped away from the metal stamping. When this occurs, the effectiveness of the water guard is destroyed and immediate replacement is required.

SUMMARY OF THE PRESENT INVENTION

The present invention has as its primary objective the provision of a novel and improved water guard which incorporates the advantages of the modified prior art water guards described above, while at the same time eliminating the problems and disadvantages associated therewith. This is accomplished by providing the water guard of the present invention with a unitary design having a radially extending mounting flange integrally joined at its inner edge to an angularly outwardly extending sealing flange. The mounting flange is adapted to be secured in a recess in the seal end plate, and to provide the sole means for supporting and maintaining the sealing flange in contact with the roll and face. Both the mounting flange and the sealing flange are elastically flexible, with the mounting flange having an inherent rigidity which is greater than that of the sealing flange.

Preferably, the water guard of the present invention consists of a single integrally molded elastomeric piece having a substantially homogeneous external surface. In the preferred embodiment, the mounting flange derives its greater rigidity from a relatively higher durometer hardness as compared with that of the sealing flange. In an alternate embodiment, the greater rigidity of the mounting flange is provided by embedding reinforcing elements within the flange body.

BRIEF DESCRIPTION OF THE DRAWINGS

FIG. 4 is a partial sectional view of a bearing assembly employing the improved water guard of the present invention;

FIG. 6 is a sectional view of the water guard of FIG. 4 on a reduced scale, and showing how the water guard can be deformed by contact with the roll end if the bearing and roll neck are misaligned during assembly;

FIG. 7 is another sectional view on a reduced scale showing the water guard exerting a pulling force on the inner seal ring and neck seal during removal of the bearing assembly from the roll neck.

DETAILED DESCRIPTION OF PREFERRED EMBODIMENTS

Figure 1:
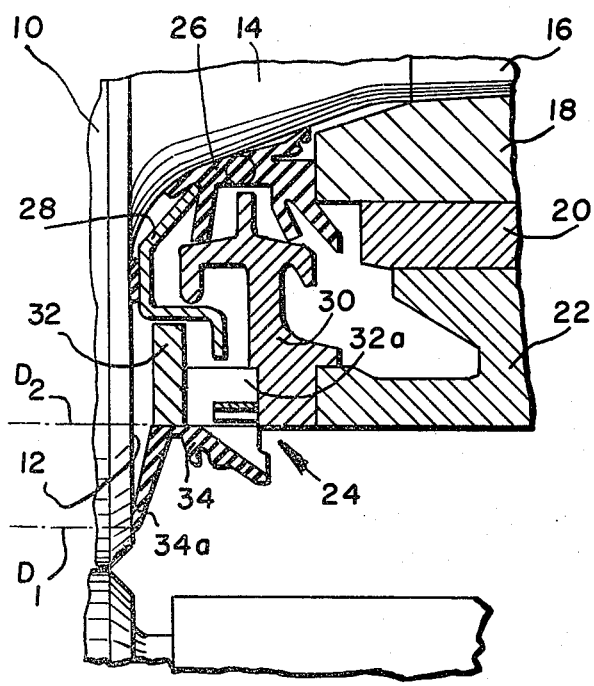
FIG. 1 is a partial view in cross section of a bearing assembly employing one form of conventional water guard.

Referring now to FIG. 4, the improved water guard of the present invention is shown at 52 between the end face 54 of a roll 56 and the seal end plate 58 of a seal assembly generally indicated at 60. As in the previously described prior art embodiments, the roll has a tapered intermediate section 62 leading to a reduced diameter end section 64 surrounded by a sleeve 66, the latter being journalled for rotation in a bushing 68 contained in a chock 70. Lubricating oil is again supplied continuously between the sleeve 66 and bushing 68. In addition to the seal end plate 58 and water guard 52, the seal assembly 60 includes an inner seal ring 72 and a resilient flanged neck seal 74, both of which rotate with the roll 56. The seal components operate in a conventional manner to confine lubricating oil within the bearing, and to exclude cooling water and entrained contaminants.

Figure 5:
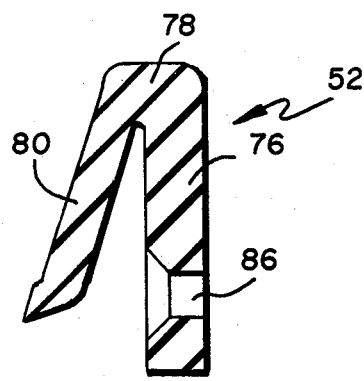
FIG. 5 is a sectional view on an enlarged scale through the water guard of FIG. 4.

The water guard 52 consists of a circular elastomeric molding. As is best shown in FIG. 5, the water guard 52 has a radially extending mounting flange 76 integrally joined at its inner edge 78 to an angularly outwardly extending sealing flange 80. As shown in FIG. 4, the mounting flange 76 is adapted to be sealed in a recess 82 in the seal end plate 58, where it is surrounded by an axially extending shoulder 84 which serves as a float stop. Appropriate holes 86 are provided in the mounting flange 76 to accept threaded fasteners 88 used to secure the water guard in place.

The mounting flange 76 and the sealing flange 80 are integrally molded in the same mold, either from a common elastomer such as for example nitrile rubber, or from different elastomers. In either case, however, the mounting flange is purposely provided with a durometer hardness which is higher than that of the sealing flange. Typical ranges for the durometer hardnesses of the flanges would be from about 70 to 80 Shore D for the mounting flange 76, and from about 60 to 70 Shore A for the sealing flange 80. This results in the mounting flange 76 having a greater rigidity than that of the sealing flange 80, although both flanges are elastically flexible, with a "memory", i.e., an ability to return to their original shapes after being deformed. Thus, the mounting flange 76 can experience deformations of the type shown in FIG. 6 when the water guard is inadvertently contacted by the roll end during bearing mounting, and still return to its original shape. By the same token, however, the mounting flange has sufficient inherent rigidity to provide the needed pulling force to axially remove the inner seal ring 72 and neck seal 74 when the bearing is being removed from the roll neck as illustrated in FIG. 7.

Because the mounting flange 76 and the sealing flange 80 are integrally molded from a common material, the external surfaces of the water guard are substantially homogeneous and free from any exposed elastomer/metal bonding interfaces. The prior art problems relating to bonding weaknesses are thus totally avoided.

All of these advantages are achieved at a relatively low cost as compared to the prior art arrangements which incorporate expensive metal stampings as reinforcing elements.

Figure 8:
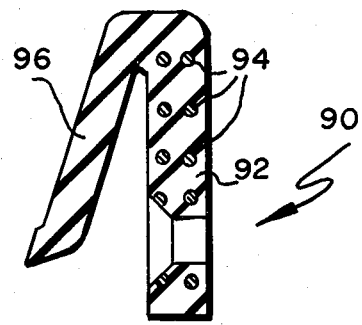
FIG. 8 is a sectional view through an alternate embodiment of a water guard in accordance with the present invention.
Figure 2:
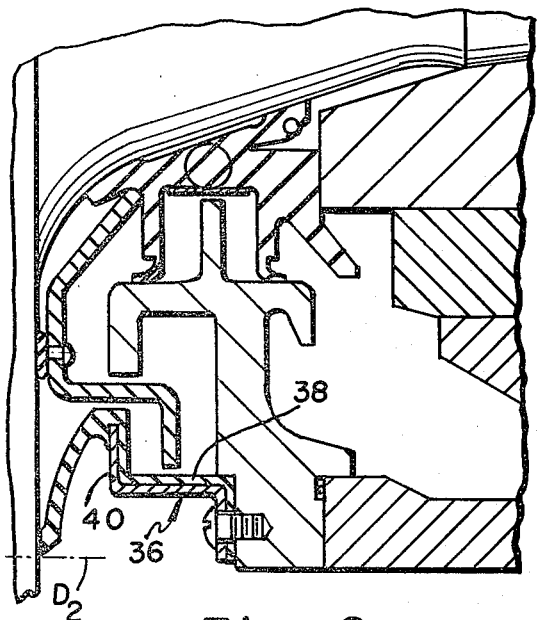
FIGS. 2 and 3 are views similar to FIG. 1 showing other conventional water guard arrangements.
Figure 3:
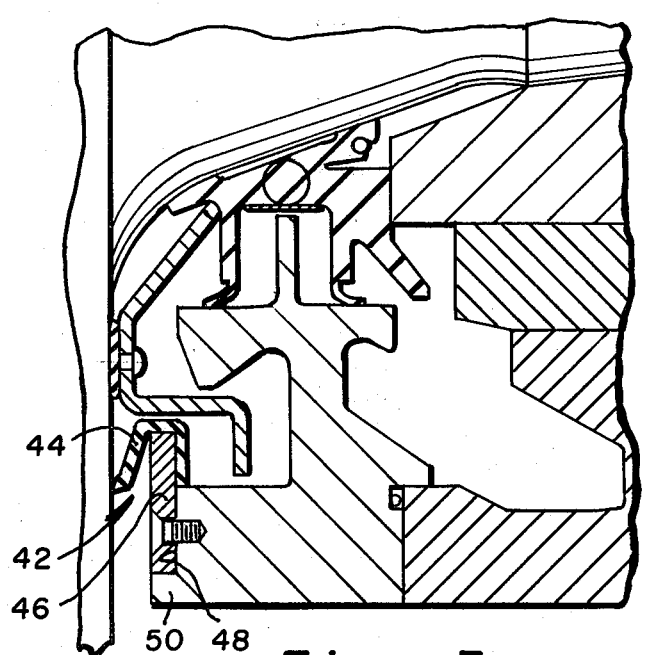

An alternate embodiment of the water guard of with the present invention is shown in FIG. 8 at 90. Here, the increased rigidity of the mounting flange 92 is achieved by embedding reinforcing elements 94 in the flange body. The reinforcing elements can comprise metal wires or other appropriate non-metallic components capable of lending the desired rigidity. Here again, both the mounting flange 92 and the sealing flange 96 are elastically flexible, and the external surfaces of the water guard are substantially homogeneous and free of any elastomer/metal bonding interfaces.

We claim:

1. In a rolling mill wherein the neck of a roll is rotatably supported in an oil film bearing contained in a bearing chock, with a seal assembly located between the roll end face and the bearing chock to retain oil in the bearing and to exclude contaminants such as cooling water, mill scale, etc. from the bearing, the said seal assembly including a circular seal end plate fixed relative to the bearing chock at a location surrounding a flexible seal mounted on the roll neck for rotation therewith, the improvement comprising: a circular water guard having a radially extending mounting flange integrally joined at its inner edge to an angularly outwardly extending sealing flange, said mounting flange being adapted to be surrounded by and to be secured to the seal end plate, said mounting flange providing the sole means for supporting and maintaining said sealing flange in frictional contact with the roll end face, both of said flanges being elastically flexible with said mounting flange having a rigidity which is greater than that of said sealing flange.

2. The apparatus of claim 1 wherein said water guard consists of a single integrally molded elastomeric piece.

3. The apparatus of claim 2 wherein said water guard has a homogeneous external surface.

4. The apparatus of claims 2 or 3 wherein said mounting flange has a durometer hardness which is higher than that of said sealing flange.

5. The apparatus of claims 2 or 3 wherein the said mounting flange is internally provided with reinforcing elements integrally molded therein.

6. The apparatus of claim 3 wherein said mounting flange is planar and of substantially uniform thickness.

7. The apparatus of claim 6 wherein said seal end plate has a circular recess facing the roll end face, and wherein said mounting flange is adapted to be seated at the base of said recess in parallel relationship to the roll end face.

8. The apparatus of claim 7 wherein the axial depth of said recess is greater than the thickness of said mounting flange.

* * * * *